United States Patent
Domingues (10) Patent No.: US 8,187,648 B2
(45) Date of Patent: *May 29, 2012

(54) PACKAGED, DEVELOPED DOUGH PRODUCTION IN LOW PRESSURE PACKAGE, AND RELATED METHODS

(75) Inventor: David J. Domingues, Plymouth, MN (US)

(73) Assignee: General Mills Marketing, Inc., Minneapolis, MN (US)

( * ) Notice: Subject to any disclaimer, the term of this patent is extended or adjusted under 35 U.S.C. 154(b) by 391 days.

This patent is subject to a terminal disclaimer.

(21) Appl. No.: 11/132,826

(22) Filed: May 19, 2005

(65) Prior Publication Data

US 2005/0281922 A1    Dec. 22, 2005

Related U.S. Application Data

(60) Provisional application No. 60/572,325, filed on May 19, 2004.

(51) Int. Cl.
*A21D 10/02* (2006.01)

(52) U.S. Cl. ........ 426/128; 426/496; 426/549; 426/551; 426/561

(58) Field of Classification Search .......................... None
See application file for complete search history.

(56) References Cited

U.S. PATENT DOCUMENTS

| | | | |
|---|---|---|---|
| 3,767,421 A | 10/1973 | Gulstad et al. | |
| 4,381,315 A | 4/1983 | Yong et al. | |
| 4,792,456 A | 12/1988 | Katz et al. | |
| 5,547,694 A | 8/1996 | Perry et al. | |
| 5,804,233 A * | 9/1998 | Lonergan et al. | 426/19 |
| 5,858,440 A | 1/1999 | Laughlin et al. | |
| 6,042,852 A | 3/2000 | Atwell et al. | |
| 6,165,533 A | 12/2000 | Laughlin et al. | |
| 6,242,024 B1 | 6/2001 | Perry et al. | |
| 6,261,613 B1 * | 7/2001 | Narayanaswamy et al. | 426/94 |
| 6,365,204 B1 | 4/2002 | Spendler et al. | |
| 6,422,455 B1 | 7/2002 | Cahill et al. | |
| 6,436,458 B2 * | 8/2002 | Kuechle et al. | 426/128 |
| 6,558,715 B1 * | 5/2003 | Rey et al. | 426/20 |
| 6,592,925 B2 | 7/2003 | Drantch et al. | |
| 6,635,291 B2 | 10/2003 | Perry et al. | |
| 6,667,065 B1 * | 12/2003 | Kragh et al. | 426/28 |
| 2003/0049358 A1 * | 3/2003 | Domingues | 426/551 |
| 2004/0037936 A1 | 2/2004 | Domingues | |
| 2004/0076722 A1 | 4/2004 | Archibald et al. | |
| 2004/0197454 A1 | 10/2004 | Henry et al. | |
| 2004/0208957 A1 | 10/2004 | Domingues | |
| 2004/0241292 A1 | 12/2004 | Geng et al. | |
| 2005/0074534 A1 | 4/2005 | Goedeken et al. | |

FOREIGN PATENT DOCUMENTS

| | | |
|---|---|---|
| WO | WO 98/51159 | 11/1998 |
| WO | WO 01/67870 | 9/2001 |
| WO | WO 02/28746 A1 | 4/2002 |
| WO | WO 03/020044 | 3/2003 |

OTHER PUBLICATIONS

Bakery Online, Description of Gluzyme® / Fungamyl Super BR. Printed Apr. 15, 2010 from www.bakeryonline.com.

* cited by examiner

*Primary Examiner* — Lien Tran
(74) *Attorney, Agent, or Firm* — Daniel C. Schulte; Arlene L. Hornilla (57) ABSTRACT

Described are developed, refrigerator-stable, dough compositions in low pressure packages and related methods, wherein the dough compositions contain chemical leavening agents that include an encapsulated basic agent.

20 Claims, 4 Drawing Sheets

PACKAGED, DEVELOPED DOUGH PRODUCTION IN LOW PRESSURE PACKAGE, AND RELATED METHODS

REFERENCE TO RELATED APPLICATIONS

This application claims the benefit of priority under 35 U.S.C. 119(e)(1) of a provisional patent application Ser. No. 60/572,325, filed May 19, 2004, which is incorporated herein by reference in its entirety.

FIELD OF THE INVENTION

The invention relates to refrigerator-stable, raw, developed dough compositions in low pressure packaging, and related methods.

BACKGROUND

Many dough products are prepared commercially to be sold as packaged, refrigerator-stable products. These packaged dough products can be stored at refrigerator conditions and cooked (e.g., baked) by removing the packaged dough from refrigerated storage and cooking the dough with little or no additional preparation. Refrigerator stable dough products can be very desirable to consumers because of their convenience.

A variety of dough products are sold commercially as being refrigerator stable. Examples include doughs sometimes referred to in the baking arts as "undeveloped doughs" such as cookies, cakes, biscuits, scones, and batters; other examples are "developed" doughs such as breads and bread-like products including French bread, white or whole wheat bread, bread sticks, bread rolls, pizza dough, cinnamon rolls, raised donuts, and other products having developed dough properties.

Developed doughs are prepared to leaven and increase the size and decrease the density of the cooked (e.g., baked) dough product. This can be done by the action of yeast or by the action of chemical ingredients ("chemical leavening agents") that react to produce a leavening gas. Leavening can take place either before or during baking. Many refrigerator stable developed dough products include chemical leavening agents, and are allowed to proof before they are packaged, during storage, or during baking.

An important component of a refrigerated dough product can be its packaging configuration and packaging materials. Packaging of a refrigerator stable dough product can contribute to retaining freshness over an extended period of refrigerated storage. Many types of packaging materials and package forms are used commercially, including pressurized cans and non-pressurized pouches or chubs.

Raw packaged dough products continue to exhibit limited refrigerated shelf lives. A packaged dough, during extended refrigerated storage, may, for example, experience deteriorated freshness in the form of discoloration or loss of leavening properties upon baking. It is a continuing goal in the packaged food arts to improve the shelf life of products such as refrigerated dough products.

SUMMARY OF THE INVENTION

The invention relates to raw, chemically-leavened (chemically-leavenable) developed dough compositions, packaged dough products, and related methods. The doughs include an encapsulated basic chemical leavening agent and a soluble acidic chemical leavening agent, and can be packaged in a low pressure package for refrigerated storage. Optionally, the dough can additionally include an insoluble acidic chemical leavening agent.

According to certain embodiments of the invention, chemically-leavened, developed dough compositions can be prepared using selected chemical leavening agents to provide desired refrigerator storage stability, e.g., when packaged in a low pressure package, and desired raw and cooked leavening properties. Functionally speaking, embodiments of the invention involve refrigerated, chemically-leavened, developed dough compositions that contain encapsulated basic agent in combination with acidic agent, wherein the acidic agent is sufficiently soluble to provide a desired relatively low pH, a desirably high raw specific volume during refrigerated storage, and a desirably high baked specific volume.

In general, it has been found that in some dough compositions, a soluble acidic agent (as opposed to using an insoluble acidic agent) can result in slightly higher raw specific volume during refrigerated storage, which can in turn result in an increased baked specific volume. Examples of desired raw specific volumes achieved during refrigerated storage can be in the range from 1.2 to 1.7 grams per cubic centimeters. Examples of desired baked specific volumes can be in the range from 3.0 to 4.5 grams per cubic centimeter.

The use of selected chemical leavening agents, as described herein, may affect pH of a dough composition, possibly in a way that relates to desired leavening properties. According to certain embodiments of the invention, it has been found that pH of a developed dough composition, during refrigerated storage and upon baking, may relate to dough properties such as raw specific volume and baked specific volume. When a dough composition includes an encapsulated basic chemical leavening agent, a relatively soluble acidic chemical leavening agent can reduce the dough pH when acidic agent dissolves in an aqueous component of the dough. A relatively low pH, e.g. below neutral, may correlate to desired leavening properties in a developed dough, such as desired raw and baked specific volumes. This may be because a developed dough relies on elasticity of a dough composition matrix for leavening. Dough elasticity allows a dough matrix to stretch without breaking, to allow gas produced during storage or cooking (e.g., baking) to cause the dough matrix to expand and to cause the overall dough volume to increase. Without being bound by theory, a relatively low dough pH (for example, below neutral), according to some embodiments of the invention, has been observed to relate to improved raw and baked specific volumes. A low pH may increase the elasticity of a dough matrix in a developed dough, resulting in a greater gas-holding capacity, and, therefore, desirably high raw and baked specific volumes.

According to specific embodiments of the invention, desirably low pH levels in developed, chemically-leavened dough compositions have been achieved using soluble acidic chemical leavening agent in combination with encapsulated basic chemical leavening agent, and optionally insoluble acidic agent. Either type of acidic agent can optionally be encapsulated.

Soluble acidic agent can be used alone, with no insoluble acidic agent. For example, acidic agent can consists of or consists essentially of soluble acidic agent such as relatively soluble sodium acid pyrophosphate, glucono-delta-lactone, or a mixture thereof. According to other embodiments, a dough composition can contain soluble acidic agent in combination with insoluble acidic agent, for example, a combination of a soluble acidic agent such as sodium acid pyrophosphate, glucono-delta-lactone, or a mixture thereof; in combination with an insoluble acidic agent such as sodium aluminum phosphate.

A dough composition for used according to the invention can be any type of a developed, "chemically-leavenable" or "chemically-leavened" (these terms being used interchangeably herein), dough composition that includes a soluble acidic chemical leavening agent and an encapsulated basic chemical leavening agent, for leavening. The dough may be proofed, partially proofed, or unproofed, when packaged or during refrigerated storage. Examples of useful types of dough compositions include chemically-leavenable, developed breads and bread-like dough compositions including French bread, bread rolls, pizza crust, raised donuts, etc.

The dough can be packaged in a low pressure package such as a chub or a pouch, with or without headspace. Exemplary packages can be made to include a flexible packaging material that can be relatively impermeable to gases such as oxygen, carbon dioxide, water vapor, etc. Package configurations do not require and can advantageously exclude a pressure relief valve or vent.

A dough composition according to the invention can be packaged in low-pressure packaging, optionally while frozen and optionally with vacuum. For example, a frozen dough can be placed in a flexible package that has sufficient volume to allow a degree of expansion of the dough composition within the flexible package, during refrigerated storage. The dough (if frozen) can thaw in the package, and during refrigerated storage the dough can leaven and expand to a degree that fills the volume, or a portion of the volume, of the package, also without producing excessive pressure inside the package. For example, the dough can partially proof during refrigerated storage to a raw specific volume in the range from about 1.2 to 1.7 grams per cubic centimeter, to produce a packaged dough product having an internal pressure that remains less than or equal to 1.5 atmosphere (atm) during refrigerated storage, e.g., for up to 6, 10, 12, or more weeks of refrigerated storage.

An aspect of the invention relates to a refrigerated packaged dough product. The dough product includes a raw developed dough composition in a low pressure package. The dough composition includes encapsulated basic chemical leavening agent, and soluble acidic chemical leavening agent, and the dough composition has a pH in the range from 5 to 6.5, after 2 weeks of refrigerated storage.

In another aspect, the invention relates to a refrigerator-stable, packaged dough product that includes a developed dough composition that includes from 0.25 to 1.5 parts by weight encapsulated basic leavening agent (weight percent based on weight of basic leavening agent alone, does not include weight of encapsulating fat or oil) and, from 0.05 to 3.33 parts by weight soluble basic chemical leavening agent selected from glucono-delta-lactone, sodium acid pyrophosphate, and mixtures thereof, in a low pressure package.

In another aspect, the invention relates to a refrigerator-stable, packaged dough product. The dough product includes a developed dough composition that contains encapsulated basic chemical leavening agent, from 0.05 to 3 weight percent soluble acidic chemical leavening agent, and from 0.03 to 1.5 weight percent insoluble acidic chemical leavening agent.

Still another aspect of the invention relates to a method of preparing a packaged dough product. The method includes providing a developed dough composition that contains encapsulated basic chemical leavening agent and soluble acidic chemical leavening agent, in a low pressure package, and storing the dough composition at refrigerated storage temperature, wherein the pH of the dough composition remains below 6.5 for at least 2 weeks of refrigerated storage.

Still another aspect of the invention relates to a method of preparing a packaged dough product. The method includes providing a developed dough composition that contains from 0.2 to 1.5 parts by weight encapsulated basic leavening agent (weight percent based on weight of basic leavening agent alone, does not include weight of encapsulating fat or oil) and from 0.3 to 3.5 parts by weight glucono-delta-lactone acidic chemical leavening agent, freezing the dough composition, placing the frozen dough composition into a low pressure package, and storing the dough composition at refrigerated storage temperature.

DETAILED DESCRIPTION

A dough composition according to the invention can be a chemically-leavenable, developed, dough composition. Developed doughs are generally understood to include doughs that have a developed gluten matrix structure; a stiff, elastic rheology; and that are capable of forming a matrix of relatively elastic bubbles or cells that hold a leavening gas while the dough expands, leavens, or rises, prior to or during cooking (e.g., baking). Features that are sometimes associated with a developed dough, in addition to a stiff, elastic rheology, include a liquid component content, e.g., water content, that is relatively high; a high protein content; a relatively low fat content; and processing steps that include time to allow the dough ingredients (e.g., protein) to interact and "develop" or strengthen the dough. Developed doughs in general can be yeast-leavened or chemically-leavened, and are normally relatively less dense prior to and after cooking (i.e., on average have a relatively higher specific volume) compared to un-developed doughs. Examples of specific types of doughs that can be considered to be developed doughs include doughs for pizza crust, breads (loaves, dinner rolls, baguettes, bread sticks), raised donuts and sweet rolls, cinnamon rolls, croissants, Danishes, pretzels, etc.

In contrast to developed doughs, doughs generally referred to as un-developed (or "non-developed") doughs have an un-developed (or less developed) matrix structure resulting in a non-elastic (or less elastic) rheology and, therefore, relatively lower raw and baked specific volumes due to reduced gas retention by the dough. Examples of un-developed types of doughs include cookies, cakes, cake donuts, muffins, and other batter-type doughs such as brownies, biscuits, etc.

Chemically-leavenable ("chemically-leavened") dough compositions are dough compositions that leaven to a substantial extent by the action of chemical ingredients that react to produce a leavening gas. Typically the ingredients include a basic chemical leavening agent and an acidic chemical leavening agent that react to produce carbon dioxide, which, when retained by the dough matrix, causes the dough to expand. Chemically-leavenable doughs can be contrasted to dough formulations that are substantially leavened due to the action of yeast as a leavening agent, i.e., by metabolic action of yeast on a substrate to produce carbon dioxide. While doughs of the invention can include yeast, e.g., as a flavoring agent, certain dough compositions of the invention do not include yeast as a leavening agent.

Acidic chemical leavening agents are generally known in the dough and bread-making arts, with examples including sodium aluminum phosphate (SALP), sodium acid pyrophosphate (SAPP), monosodium phosphate, monocalcium phosphate monohydrate (MCP), anhydrous monocalcium phosphate (AMCP), dicalcium phosphate dihydrate (DCPD), glucono-delta-lactone (GDL), as well as a variety of others. Commercially available acidic chemical leavening agents include those sold under the trade names: Levn-Lite® (SALP), Pan-O-Lite® (SALP+MCP), STABIL-9® (SALP+AMCP), PY-RAN® (AMCP), and HT® MCP (MCP). Optionally, an acidic chemical leavening agent for use according to the invention (either soluble or insoluble), can be encapsulated. According to the invention, a chemically-leavenable dough includes acidic chemical leavening agent that is soluble in a liquid (e.g., aqueous) component of the dough composition, at a temperature used during processing (e.g., from 40 to about 72 degrees Fahrenheit) or refrigerated storage (e.g. from about 32 to about 55 degrees Fahrenheit). A soluble acidic chemical leavening agent is an acidic agent that is sufficiently soluble to dissolve in a dough composition at a temperature within processing and refrigerated storage ranges, to affect pH and to react with a basic chemical agent if available, e.g., is freely soluble or will substantially entirely dissolve.

Particularly useful soluble acidic chemical leavening agents include glucono-delta-lactone and sodium acid pyrophosphate (SAPP) of a moderate to high solubility e.g., SAPP 60, SAPP 80, as well as other acidic chemical leavening agents that exhibit similar solubility behavior.

Soluble acidic chemical leavening agent can be present in an amount that provides one or more useful properties as described herein, including refrigerated stability, desired refrigerated raw specific volume, desired baked leavening properties following refrigerated storage, and desired pH during refrigerated storage. For example, an amount of soluble acidic agent can be included to provide a raw specific volume in the range from 1.2 to 1.7 grams per cubic centimeter, during refrigerated storage, as well as a desired baked specific volume upon baking, such as a baked specific volume in the range from 3.0 to 4.5. Also, soluble acidic chemical leavening agent can, according to certain embodiments, provide a desirably low pH during refrigerated storage or at the start of baking.

A desirable pH may depend on the exact formulation of a dough composition, including the amounts and types of acidic chemical leavening agents included, and whether only soluble acidic agent is included or (see below) whether an insoluble acidic agent is used in combination with a soluble acidic agent. In general, useful pH levels may be on the acidic side of neutral, for example, less than 7 (e.g., from 5 to 6.8) according to some embodiments of the invention. According to embodiments of the invention that include only soluble acidic agent, without additionally including insoluble acidic agent, an exemplary pH may be in the range from 5 to 6.5. According to embodiments of the invention that include soluble acidic agent in combination with insoluble acidic agent, an exemplary pH may be in the range from 6 to 6.8.

Optionally, in combination with a soluble acidic chemical leavening agent, dough compositions according to the invention can include an amount of insoluble acidic chemical leavening agent. Insoluble acidic chemical leavening agent refers to acidic chemical leavening agents that are not substantially soluble at a processing or refrigeration temperature, but are insoluble or only slightly soluble at processing and refrigerated storage temperatures, and that are substantially soluble at temperatures that a dough reaches during baking (e.g., early baking). Insoluble acidic chemical leavening agents include sodium aluminum phosphate (SALP) and other acidic chemical leavening agents that have solubility properties that are similar to SALP.

A combination of soluble and insoluble acidic agents may result in a combination of desired raw and baked specific volumes. A desired raw specific volume can result from the soluble acidic agent reacting to produce a desired amount of leavening gas during processing or refrigerated storage. A desired baked specific volume can result from the insoluble acidic agent reacting to produce an amount of leavening gas during baking. More specifically, soluble acidic agent can react during processing or refrigerated storage to contribute to a raw specific volume that results in a desirably high baked specific volume upon baking, when present in combination with the insoluble acidic agent. For example a raw specific volume in the range from 1.2 to 1.7 grams per cubic centimeter may be achieved during refrigerated storage. Insoluble acidic agent that does not dissolve and react during processing or refrigerated storage, will, upon baking, dissolve and produce leavening gas to cause the dough composition to expand during baking, resulting in a desirably high baked specific volume, for example a baked specific volume in the range from 3 to 4.5 grams per cubic centimeter, or from 3.5 to 4.5 grams per cubic centimeter.

Without being bound by theory, it is also desirable for insoluble acidic agent, if used, to dissolve early during baking of a developed dough. A developed dough may be relatively lean, possibly including no more than 5 percent by weight fat. Fat, if present in a dough composition, can act as a natural plasticizing agent that can facilitate leavening during baking. A developed dough composition, having a relatively low concentration of fat, can be relatively more difficult to cause to leaven compared to dough compositions that contain more fat. Steps to overcome this difficulty in leavening a developed dough composition, having a relatively low fat concentration, according to the invention, can include one or more of: initiating dough expansion prior to baking (i.e., higher RSV value) by using more soluble leavening acid; including an insoluble acidic agent to provide leavening during baking; and, lowering dough pH to increase gluten protein solubility and expansion capacity.

As an example, embodiments of dough compositions according to the invention can include a blend of soluble glucono-delta-lactone and insoluble sodium aluminum phosphate, or soluble sodium acid pyrophosphate and insoluble sodium aluminum phosphate. The combination of some amount of soluble acidic agent and some amount of insoluble acidic agent can produce a desired combination of desired (e.g., reduced) pH during refrigerated storage, and desired leavening properties during refrigerated storage and baking, such as a desired baked specific volume. The soluble acidic agent can reduce the pH of the raw dough and during refrigerated storage, and react with basic agent to increase raw specific volume to a desired amount. An insoluble acidic agent can remain substantially undissolved during processing and refrigerated storage, and perform to leaven a dough during baking.

The total amount of acidic chemical leavening agent included in a dough composition can be an amount that is useful to prepare a dough composition having desired raw and baked specific volumes, and pH, as described herein. According to dough composition embodiments that include soluble acidic agent, and do not include any insoluble acidic agent, the amount of soluble acidic agent can be an amount that provides desired relatively low pH during refrigerated storage (e.g., a pH in the range from 5 to 6.5), and that produces a desired baked specific volume upon baking. An amount that is stoichiometric to the amount of basic agent can be useful, as well as amounts that are above and below a stoichiometric amount. Exemplary useful amounts of soluble acidic agent can be a function of the neutralization value of the soluble acidic agent that is used (e.g., weight of basic agent neutralized by 100 parts leavening acid) and the stoichiometric amount of basic agent to be neutralized. Exemplary amounts of soluble acidic agent may be in the range from 0.3 to 3.5 weight percent soluble acidic agent, based on the total weight of a dough composition, e.g., from 0.5 to 3.33 weight percent.

In embodiments of dough compositions that include both soluble and insoluble acidic agents, any useful total amounts of each can be used. Functionally speaking, useful amounts of soluble and insoluble acidic agents can provide desired low pH during refrigerated storage, a desired raw specific volume during refrigerated storage, and a desired baked specific volume. To achieve desired combinations of these dough properties, an amount of total acidic chemical leavening agent (e.g., relatively GDL or SAPP, or a combination of GDL and SAPP in combination with SALP) may be in the range to stoichiometrically neutralize the amount of basic leavening agent added to the dough formula as determined by their inherent neutralization values.

A particular amount of acid or a combination of acids can depend on factors that include the amount of basic agent to be neutralized; the specific acidic agents that are used (e.g., GDL, SAPP, and SALP), and 3) the relative amounts of the different acidic agents that are used. Different acidic agents have different neutralization values, which will determine how much of a given acidic agent is required to neutralize a specific amount of basic agent.

The relative amounts of insoluble and soluble acidic agents can be any useful amounts, with examples of useful ratios of soluble to insoluble acidic agents being from 15:85 to 85:15. In terms of amounts, useful amounts of soluble acidic agent, in a dough composition that contains both soluble and insoluble acidic agents, can be from 0.05 to 3, e.g., from 0.05 to 2.8 weight percent soluble acidic agent, based on total weight of a dough composition; useful amounts of insoluble acidic agent, in a dough composition that contains both soluble and insoluble acidic agents, can be from 0.03 to 1.5, e.g., from 0.03 to 1.275 weight percent insoluble acidic agent, based on total weight of a dough composition.

The dough composition also includes encapsulated basic chemical leavening agent. Useful basic chemical leavening agents are generally known in the dough and baking arts, and include soda, i.e., sodium bicarbonate ($NaHCO_3$), potassium bicarbonate ($KHCO_3$), ammonium bicarbonate ($NH_4HCO_3$), etc. These and similar types of basic chemical leavening agents are generally freely soluble in an aqueous component of a dough composition at processing and refrigerated storage temperatures.

The amount of basic chemical leavening agent used in a dough composition may be sufficient to react with the included acidic chemical leavening agent to release a desired amount of gas for leavening, thereby causing a desired degree of expansion of the dough product. The typical amount of a basic chemical leavening agent such as sodium bicarbonate may be in the range from about 0.2 or 0.25 to about 1.5 weight percent based on the total weight of a dough composition, including the range from about 0.75 to about 1.25 weight percent based on total weight of a dough composition. (As used throughout this description and claims, unless otherwise noted, amounts of basic chemical leavening agents and encapsulated basic chemical leavening agents are given in terms of the amount of active basic agent, not including the weight of any encapsulant or barrier material.)

Encapsulated basic chemical leavening agents are generally known, and can be prepared by methods known in the baking and encapsulation arts. An example of a method for producing enrobed particles is the use of a fluidized bed.

Encapsulated basic chemical leavening agents are typically particles that include solid basic chemical leavening agent particulates covered in part, e.g., substantially completely, by a barrier material or encapsulant. Encapsulated particles are known in the baking arts, and include encapsulated particles sometimes referred to as "enrobed" particles, as well as those sometimes referred to as "agglomerated" particles. The barrier material or encapsulant forms a coating or shell around a single or multiple particulates of solid basic chemical leavening agent, separating the chemical leavening agent from a bulk dough composition. "Enrobed" particles generally include a single particulate of chemical leavening agent covered or coated by barrier material, and "agglomerate" particles generally include 2, 3, or more particulates of chemical leavening agent contained in a mass of barrier material.

Encapsulating the basic chemical leavening agent provides separation between the basic chemical leavening agent and the bulk of the dough composition to inhibit, prevent, or slow the progress of reaction of the basic and acidic leavening agents. On the other hand, due to cracks, incomplete coverage, or damage to encapsulated particles, some amount of basic agent can be exposed, allowing it to dissolve into a dough composition, contact dissolved acid, and react to produce carbon dioxide. Due to such imperfect encapsulation, dissolved acidic agent can react with an amount of exposed basic agent, during processing or refrigerated storage, to produce carbon dioxide gas that can expand (e.g., proof or partially proof) the dough.

The chemically-leavenable developed dough composition can contain other ingredients generally known in the dough and bread-making arts, typically including flour, a liquid component such as oil or water, sugar (e.g., glucose), chemical leavening agents as described, and optionally additional ingredients such as shortening, salt, dairy products, egg products, processing aids, emulsifiers, particulates, dough conditioners, yeast as a flavorant, other flavorings, etc. Many formulations for chemically-leavenable developed doughs are known to those skilled in the dough and baking arts and are readily available to the public in commercial cookbooks.

A flour component can be any suitable flour or combination of flours, including glutenous and nonglutenous flours, and combinations thereof. The flour or flours can be whole grain flour, wheat flour, flour with the bran and/or germ removed, or combinations thereof. Typically, a developed dough composition can include between about 30% and about 70% by weight flour, e.g., from about 40% to about 60% by weight flour, such as from about 45 to 55 weight percent flour.

Examples of liquid components include water, milk, eggs, and oil, or any combination of these. For example, a liquid component may include water, e.g., in an amount in the range from about 15 to 35 weight percent, although amounts outside of this range may also be useful. Water may be added during processing in the form of ice, to control the dough temperature in-process; the amount of any such water used is included in the amount of liquid components. The amount of liquid components included in a developed dough composition can depend on a variety of factors including the desired moisture content and rheological properties of the dough composition. Typically, liquids (e.g., water) can be included in an ingredient in a developed dough composition in an amount between about 20% by weight and about 40% by weight, e.g., between about 25% by weight and about 35% by weight.

A developed dough composition can optionally include egg or dairy products such as milk, buttermilk, or other milk products, in either dried or liquid forms. Non-fat milk solids which can be used in the dough composition can include the solids of skim milk and may include proteins, mineral matter, and milk sugar. Other proteins such as casein, sodium caseinate, calcium caseinate, modified casein, sweet dairy whey, modified whey, and whey protein concentrate can also be used in these doughs.

A developed dough composition can optionally include fat ingredients such as oils (liquid fat) and shortenings (solid fat). Examples of suitable oils include soybean oil, corn oil, canola oil, sunflower oil, and other vegetable oils. Examples of suitable shortenings include animal fats and hydrogenated vegetable oils. If included in a developed dough, fat is typically used in an amount less than about 10 percent by weight, often less than 5 percent by weight of the dough composition.

A developed dough can optionally include one or more sweeteners, either natural or artificial, liquid or dry. Examples of suitable dry sweeteners include lactose, sucrose, fructose, dextrose, maltose, corresponding sugar alcohols, and mixtures thereof. Examples of suitable liquid sweeteners include high fructose corn syrup, malt, and hydrolyzed corn syrup.

The dough composition can further include additional flavorings, for example, salt, such as sodium chloride and/or potassium chloride; whey; malt; yeast extract; yeast (e.g., inactivated yeast); spices; vanilla; etc.; as is known in the dough product arts.

As is known, dough compositions can also optionally include other additives, colorings, and processing aids such as emulsifiers, strengtheners (e.g., ascorbic acid), preservatives, and conditioners. Suitable emulsifiers include lecithin, mono- and diglycerides, polyglycerol esters, and the like, e.g., diacetylated tartaric esters of monoglyceride (DATEM) and sodium stearoyl-2-lactylate (SSL). Acidulants commonly added to food foods include lactic acid, citric acid, tartaric acid, malic acid, acetic acid, phosphoric acid, and hydrochloric acid.

Conditioners, as are known in the dough products art, can be used to make the dough composition tougher, drier, and/or easier to manipulate. Examples of suitable conditioners can include azodicarbonamide, potassium sulfate, potassium sorbate, L-cysteine, L-cysteine hydrochloride, sodium bisulfate, mono- and di-glycerides, polysorbates, sodium bisulfite, sodium stearoyl lactylate, ascorbic acid and diacetyltartaric acid esters of mono- and di-glycerides (DATEM), and the like. These conditioners may add functionality, reduce mix times, and provide softness to the doughs to which they are added.

Dough compositions described herein can be prepared according to methods and steps that are known in the dough and dough product arts. These can include steps of mixing or blending ingredients, folding, lapping with and without fat or oil, forming, shaping, cutting, rolling, filling, etc., which are steps well known in the dough and baking arts.

A dough composition as described herein can be prepared, packaged, stored, and sold or used, as is typical or otherwise useful for refrigerated, developed, chemically-leavened dough compositions. For example, a dough composition may be prepared and packaged in a proofed, unproofed, or partially-proofed condition.

According to certain embodiments of the invention, a dough composition can be packaged in a low pressure or non-pressurized package, and sold in a form that can be refrigerator-stable. Examples of low pressure or non-pressurized packaging configurations include plastic tubes, chubs, or pouches. Another general example of a low pressure package can include packaging configurations that generally include a rigid material such as a rigid plastic tray and a flexible film portion that closes the tray, optionally but not necessarily including a pressure relief valve. A non-pressurized container means that the packaging is not designed to produce or maintain a pressurized interior space, e.g., an interior pressure greater than approximately 1.5 atm (absolute). The packaging material does not require a pressure relief valve. Exemplary packaging materials that may be useful for non-pressurized pouch, tube, or chub packaging, can include flexible plastic materials that act as an adequate oxygen barrier, to promote storage and freshness.

The packaging can be flexible, and may be prepared from materials such as paper or polymeric materials, such as polymeric (e.g., plastic) film. A polymeric film may be prepared from generally well known packaging material polymers such as different polyesters (e.g., PET), nylons, polyolefins (e.g., polyethylene), vinyls, polyalcohols, etc.

According to certain embodiments of the invention, the dough composition can be packaged in an unproofed condition, and can leaven (e.g., proof or partially proof) while packaged, e.g., during refrigerated storage. As a specific example, an unproofed dough composition, e.g., having a raw specific volume in the range from 0.9 to 1.2 cc/g, can be placed in a flexible package, optionally with reduced or limited headspace. During refrigerated storage, the unproofed dough composition can experience an amount of leavening (e.g., proofing) while inside the package, to result in a raw specific volume of a partially-proofed dough composition, e.g., from 1.2 to 1.7 cc/g. This leavening occurs due to reaction between the soluble acidic agent with the basic chemical leavening agent; dissolved acid can react with an amount of basic agent that is exposed to the acid due to imperfect encapsulation.

The package that contains the unproofed dough composition can be flexible but is not necessarily stretchable, and can optionally be evacuated to contain folds or wrinkles, or otherwise be of a form, e.g., geometry or shape, or combination of these, to allow an increase in internal volume of the flexible package without substantial stretching, to accommodate an increase in volume of the dough composition while inside the flexible package, during refrigerated storage. Examples of packaging materials and methods of packaging chemically-leavened doughs are discussed, e.g., in Applicant's copending United States patent application, entitled "PACKAGED DOUGH PRODUCT IN FLEXIBLE PACKAGE, AND RELATED METHODS," U.S. Ser. No. 10/446,481, filed May 28, 2003.

According to certain embodiments of the invention, a flexible package can be sized to accommodate the leavened (e.g., partially-proofed) dough composition, meaning that the flexible package is of sufficient size (volume) to contain the unproofed dough composition, with volume left over to allow the dough to leaven inside of the package. For example, the fully sized (without stretching) volume of the flexible package may be from about 1.1 to about 1.5 times the volume of the unproofed dough composition. Matching the fully sized volume of the package to the approximate volume of the leavened (e.g., partially-proofed) dough composition can allow a leavened dough composition to fit well in the package with limited headspace and without a pressurized interior. For example, an internal pressure of a package, following partial proofing, can be less than 1.5 atm (absolute), e.g., from 1 to 1.3 atm (absolute). Generally speaking, the pressure within a pouch-type package can be atmospheric pressure, prior to any expansion of the dough composition, and up until the point at which the volume of the expanding dough composition or released leavening gas surpasses the fully expanded volume of the pouch package.

Thus, embodiments of the invention allow placing unproofed dough composition into a flexible package, with reduced or limited headspace, and allowing the dough composition to leaven, e.g., partially proof, while in the package, to produce a packaged dough product also containing limited headspace and low internal pressure. During leavening of the dough composition inside the flexible package, the internal volume of the flexible package can increase to accommodate the expanding dough composition by a change in form or shape of the packaging material, without substantial stretching. A pressure relief valve also is not required.

The proofed volume of an unproofed dough composition can be calculated ahead of time so the fully sized volume of the package can accommodate the proofed volume. The fully sized volume of the flexible package can be approximately equal to the volume of the proofed (e.g., partially proofed) dough composition, with limited headspace or essentially no headspace, and with the internal pressure of the packaged dough product equal to that of the exterior atmospheric pressure. This may occur with minimal stretching of a flexible packaging material.

According to one particular mode of providing an unproofed dough composition in a package for partial proofing, a packaging material (having an unstretched internal volume greater than the volume of the unproofed dough composition) can conform to an unproofed dough composition by wrinkling, folding, or otherwise being shaped to conform to the volume of the contained unproofed dough composition, e.g., optionally by using a vacuum. A dough composition can be placed into an oversized flexible package and the flexible package can be collapsed upon or shaped to conform to the dough composition, to eliminate headspace. Headspace can be removed mechanically or with vacuum. The dough composition can be frozen if vacuum is used to reduce headspace, because the frozen dough composition is less susceptible to damage. The package can then be sealed.

Optionally, headspace can be removed from a package using vacuum, to produce a negative pressure inside the package, which can then be sealed. For example, a packaging chamber can be evacuated (e.g., to 0-5 millibar), prior to sealing the pouch. Subsequent to sealing, the vacuum in the chamber is released and the film collapses around the dough contained in the package, as the chamber equilibrates to atmospheric pressure. The dough and package are at 1 atmosphere. A flexible packaging material conforms and collapses about the dough. As the dough expands upon partial leavening, e.g., during refrigerated storage, the internal pressure exerted on the collapsed package causes the packaging material to expand to accommodate the expanded dough volume.

Exemplary embodiments of the invention are described herein. Variations on the exemplified embodiments will become apparent to those of skill in the relevant arts upon reading this description. The inventors expect those of skill to use such variations as appropriate, and intend for the invention to be practiced otherwise than specifically described herein. Accordingly, the invention includes all modifications and equivalents of the subject matter recited in the claims as permitted by applicable law. Moreover, any combination of the above-described elements in all possible variations thereof is encompassed by the invention unless otherwise indicated.

Examples of Low Pressure Pizza Crust Dough

Sample doughs were prepared and tested to assess the effectiveness of encapsulated GDL, encapsulated SAPP, free GDL, free SAPP, and free SALP, to leaven low-pressure refrigerated pizza crust dough.

| Ingredient | Mixing Stage | % | gm |
|---|---|---|---|
| Pizza Crust Formula & Process | | | |
| flour | 1 | 56 | 12600 |
| gluten | 1 | 3.86 | 868.5 |
| water | 1 | 20.4 | 4590 |
| ice | 1 | 8.75 | 1968.75 |
| margarine/short. | 1 | 1.03 | 231.75 |
| xanthan gum | 1 | 0.05 | 11.25 |
| monoglycerides | 1 | 0.3 | 67.5 |
| gluzyme | 1 | 0.001 | 0.225 |
| Top note | 1 | 1 | 225 |
| Bread Flavor | 1 | 0.3 | 67.5 |
| salt | 2 | 1.5 | 337.5 |
| sucrose | 2 | 1.5 | 337.5 |
| dextrose | 2 | 3.5 | 787.5 |
| Ascorbic acid | 2 | 0.01 | 2.25 |
| e-soda (BalChem 75) | 3 | 0.8 | 180 |
| TOTAL | | 99.00 | 22275 |
| Acidic Agent | | | |
| Sample 1 Bakeshure 496 | 3 | 1.9 | 427.5 |
| Sample 2 e-SAPP 75 | 3 | 1.11 | 249.75 |
| Sample 3 GDL | 2 | 1.33 | 299.25 |
| Sample 4 SAPP RD1 | 2 | 0.833 | 187.425 |
| Sample 5 SALP | 2 | 0.6 | 135 |

| | |
|---|---|
| Mixing Horizontal bar Mixer | BU target = 1000 +/− 100<br>Stage 1: 1 min. 36 rpm<br>4 min. 72 rpm<br>Stage 2: 1 min. 36 rpm<br>4.5 min. 72 rpm<br>Stage 3: 2 minute 72 rpm |
| Sheeting Rhonda with scrappers attached | 1) 5 Kg dough, sheet down to 7 mm<br>2) 3 fold, 90 turn<br>3) Sheet to 7 mm<br>4) 3 fold, 90 turn<br>5) Sheet to 3 mm |
| Cutting | Cut into 15 cm x 19 cm rectangular pad 220 +/− 20 gm |
| Roll/Freeze | Place plastic on one side of pad and jelly roll<br>Freeze product |

Formula/Process—

Packaged approximately 14 samples per formula per package width.

Pouch:
Width 1=3.625"×11.75" (10.25" length after sealing).
Width 2=3.5"×11.75" (10.25" length after sealing).
Film: CURPOLENE® GRADE 7170
Pouches vacuumed sealed using a MultiVac C-500 packaging machine set at approximately 5 mb.
Stored packaged product at 45° F. and evaluated after week 0, 2, 4, 6, 8, 10, and 12 weeks.

Dough made with GDL displayed the lowest pH, highest RSV, and generally high BSV values. Average pouch volume was greatest in GDL-leavened samples. GDL is fairly soluble and reacts with soda to lower dough pH and produce $CO_2$ gas that in turn results in dough and package expansion. The larger initial RSV values resulted in larger comparative BSV values.

Dough made with SALP displayed the highest pH, lowest RSV, lowest BSV, and smallest average pouch volumes.

Dough made with moderately-soluble SAPP resulted in an intermediate pH value, slightly elevated RSV values, and fairly high BSV values. Average pouch volumes for such SAPP-leavened dough was also intermediate to that of GDL and SALP leavened samples.

In some instances, encapsulation of GDL and SAPP afforded a certain degree of protection from hydration upon mixing resulting in more leavening agent being delivered to the packaged dough. More leavening in the dough resulted in greater dough expansion upon storage (i.e., larger RSV values) that in turn resulted in larger BSV values.

Figure 1:
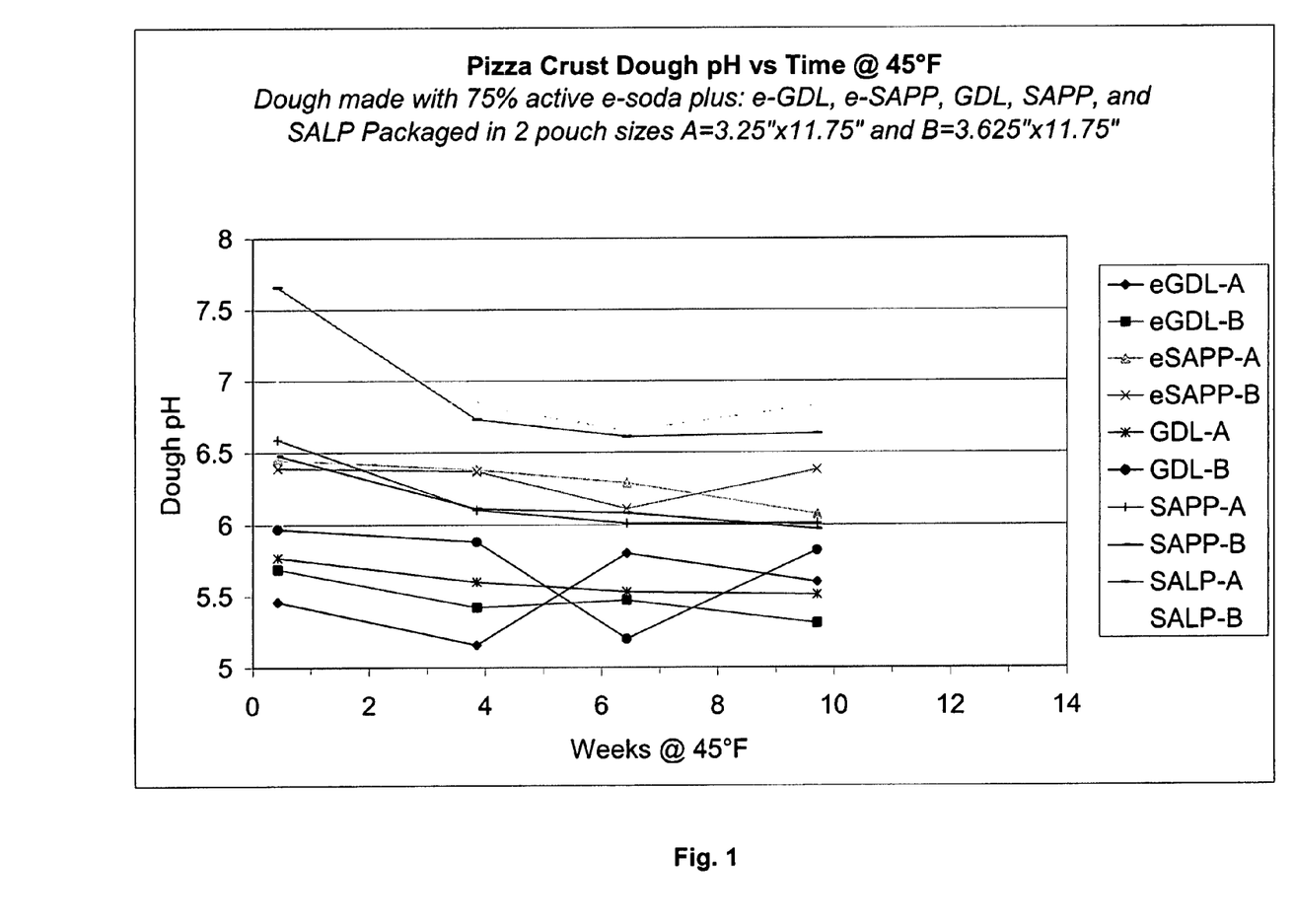
FIGS. 1 through 4 are graphs that illustrate pH, raw specific volume, baked specific volume, and pouch volume, of exemplary dough products of the invention over periods of refrigerated storage.
Figure 2:
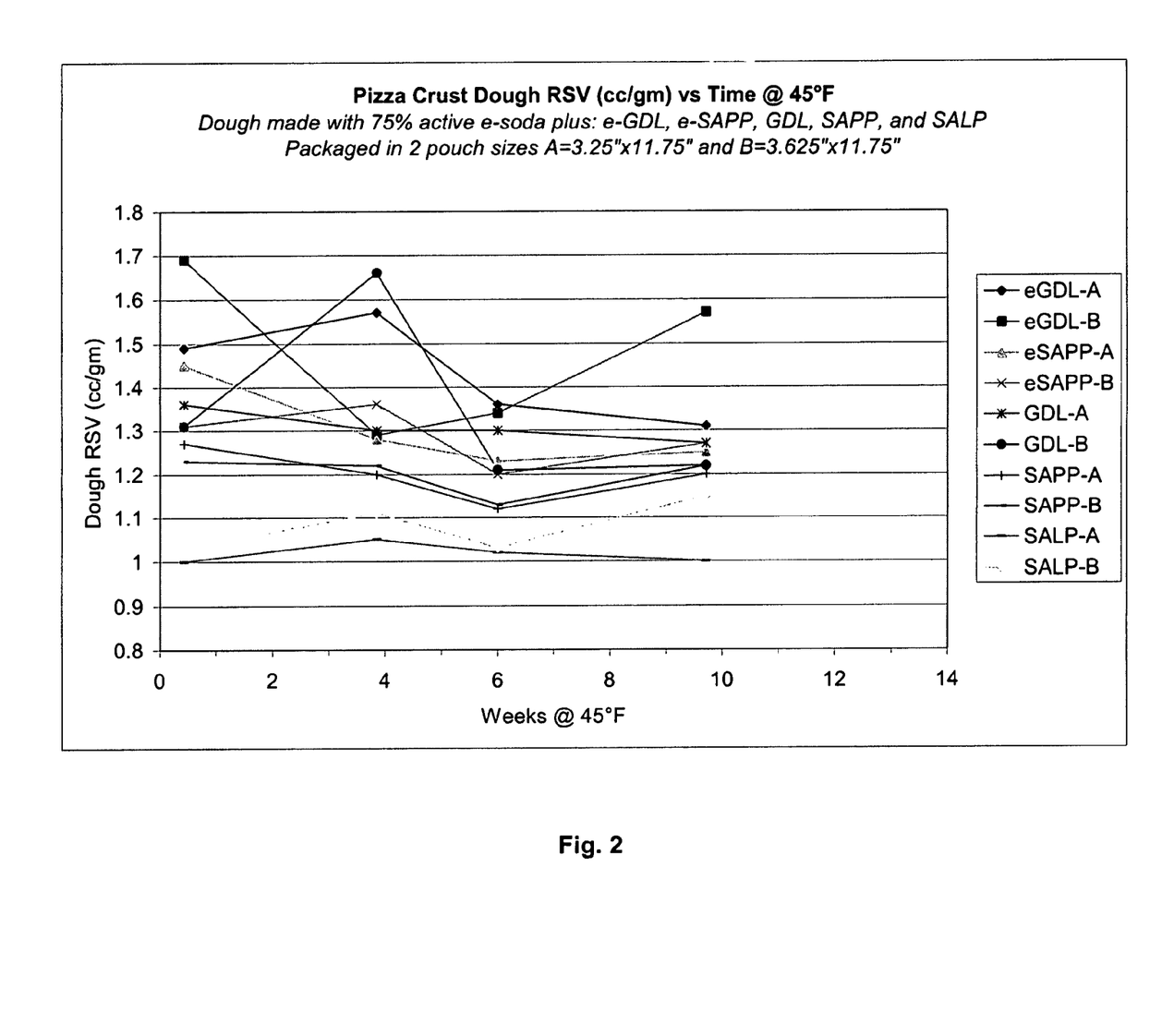
Figure 3:
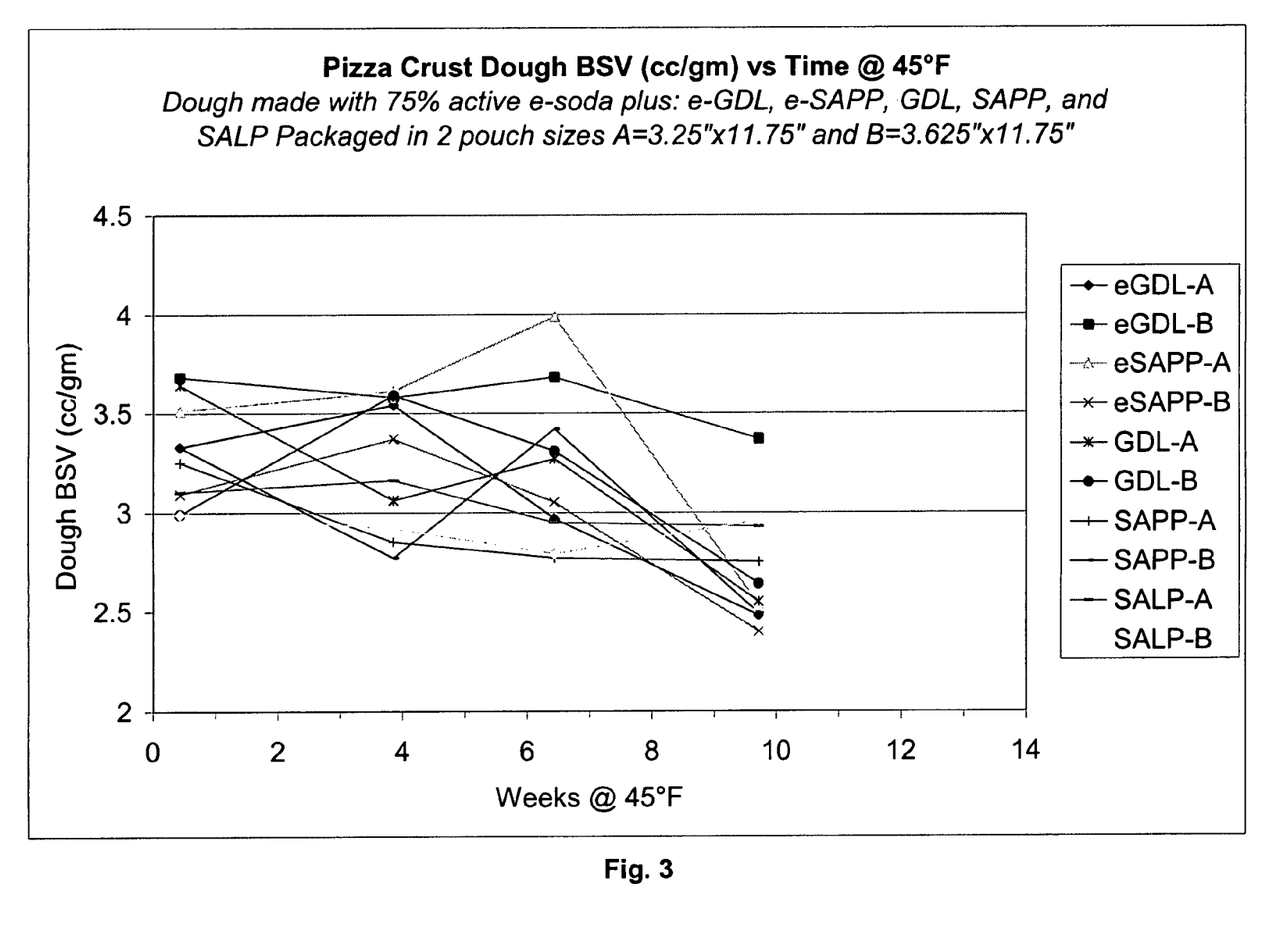
Figure 4:
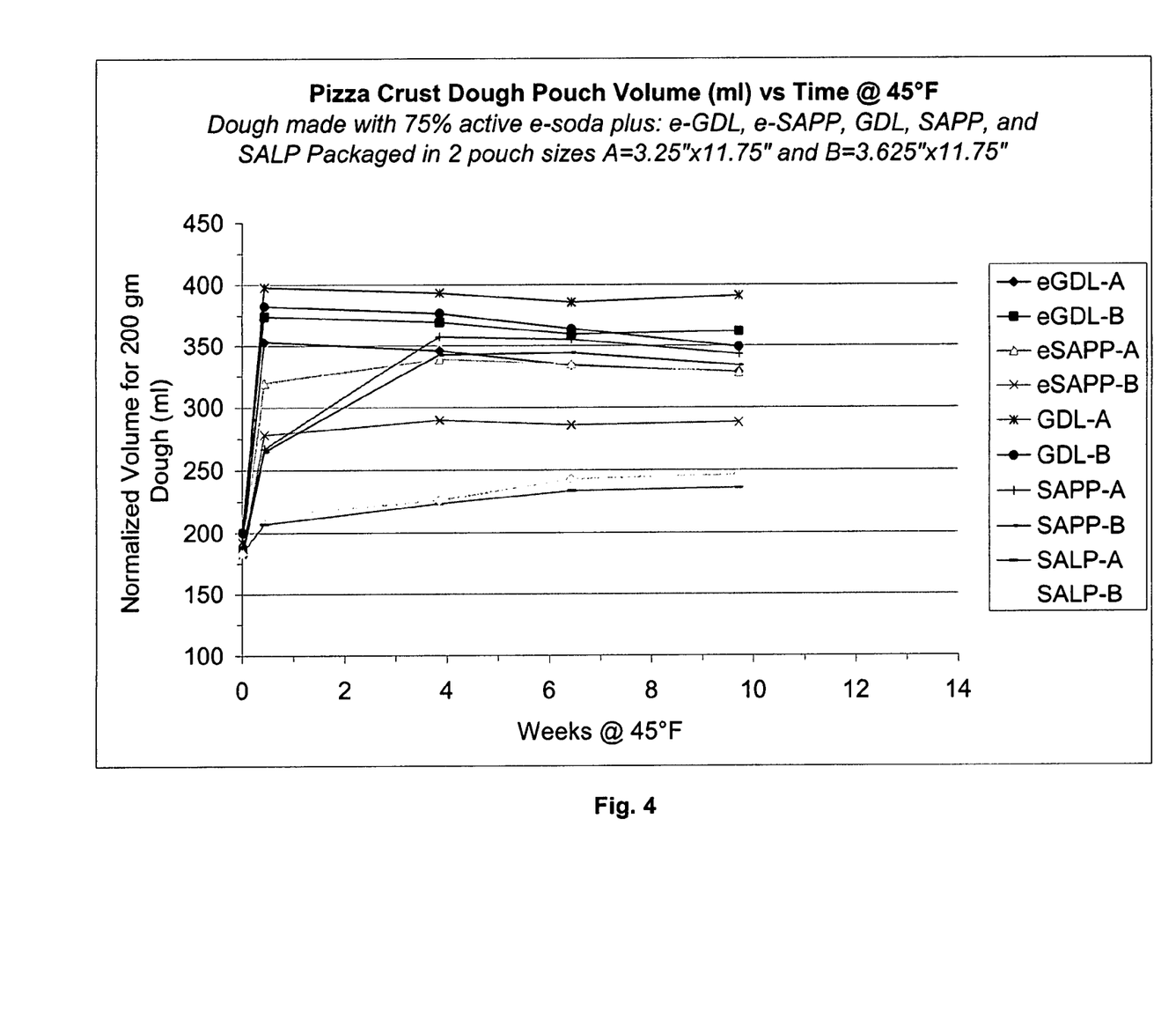

FIGS. 1 through 4 illustrate information relating to the different samples.

What is claimed is:

1. A refrigerated packaged dough product comprising a raw developed dough composition in a low pressure package, the dough composition comprising
   fat in an amount that is no more than 5 percent of the total dough composition,
   encapsulated basic chemical leavening agent, and
   soluble acidic chemical leavening agent, and
   glucose oxidase enzyme,
the dough having a pH in the range from 5 to 6.5, after 2 weeks of refrigerated storage; wherein the packaged dough product has essentially no headspace.

2. The product of claim 1 wherein after 6 weeks of storage at 40 degrees Fahrenheit, the developed dough composition has a raw specific volume in the range from 1.2 to 1.7 cubic centimeters per gram.

3. The product of claim 1 wherein after 6 weeks of refrigerated storage at 40 degrees Fahrenheit, the dough can be baked to a baked specific volume in the range from 3 to 4.5 grams per centimeter.

4. The product of claim 1 wherein the raw dough composition comprises soluble acidic chemical leavening agent selected from the group consisting of sodium acid pyrophosphate, glucono-delta-lactone, and mixtures thereof.

5. The product of claim 4 wherein after 6 weeks of storage at 40 degrees Fahrenheit, the dough pH in the range from 5 to 6.5.

6. The product of claim 1 wherein the raw dough composition comprises soluble acidic chemical leavening agent and insoluble acidic chemical leavening agent.

7. The product of claim 1 wherein the developed dough comprises
   from 30 to 70 weight percent flour,
   from 0.05 to 3 weight percent soluble acidic chemical leavening agent,
   from 0.03 to 1.5 weight percent insoluble acidic chemical leavening agent, and
   from 0.2 to 1.5 weight percent encapsulated basic chemical leavening agent, based on the total weight of the dough composition.

8. The refrigerator-stable, packaged dough product of claim 1 wherein the developed dough composition comprises
   from 0.2 to 1.5 parts by weight encapsulated basic leavening agent and,
   from 0.3 to 3 parts by weight soluble acidic chemical leavening agent selected from the group consisting of glucono-delta-lactone, sodium acid pyrophosphate, and mixtures thereof, in a low pressure package.

9. The product of claim 8 wherein after 6 weeks of storage at 40 degrees Fahrenheit, the pH in the range from 5 to 6.5.

10. A refrigerator-stable, packaged dough product comprising a developed dough composition comprising
    fat in an amount that is no more than 5 percent by weight of the dough composition,
    glucose oxidase enzyme,
    encapsulated basic chemical leavening agent,
    from 0.05 to 3 weight percent soluble acidic chemical leavening agent, and
    from 0.03 to 1.5 weight percent insoluble acidic chemical leavening agent, wherein the packaged dough product has essentially no headspace.

11. The product of claim 10 wherein after 6 weeks of storage at 40 degrees Fahrenheit, the developed dough composition has a raw specific volume in the range from 1.2 to 1.7 cubic centimeters per gram.

12. The product of claim 10 wherein after 6 weeks of storage at 40 degrees Fahrenheit, the pH in the range from 5 to 6.5.

13. A method of preparing a packaged dough product, the method comprising
    providing a developed dough composition comprising
      encapsulated basic chemical leavening agent, and
      soluble acidic chemical leavening agent,
      glucose oxidase enzyme,
    in a package having essentially no headspace, and
    storing the packaged dough composition at refrigerated storage temperature for at least two weeks,
    wherein the pH of the dough composition remains below 6.5 for at least 2 weeks of refrigerated storage.

14. The method of claim 13 wherein the developed dough, when placed in the package, has a raw specific volume in the range from 0.9 to 1.5 cubic centimeters per gram.

15. The method of claim 13 comprising:
    providing the developed dough,
    freezing the developed dough,
    placing the frozen dough composition into a package,
    reducing headspace of the package containing the frozen dough composition while the dough composition is frozen, and
    storing the packaged dough composition at refrigerated storage temperature for at least two weeks.

16. The method of claim 13 wherein the dough is placed in the package at a raw specific volume in the range from 0.9 to 1.2 cubic centimeters per gram, and the dough leavens inside the package during refrigerated storage to a raw specific volume in the range from 1.2 to 1.7 cubic centimeters per gram.

17. The method of claim 16 wherein the package has an internal pressure of less than about 15 pounds per square inch (1 atmosphere) absolute.

18. A method of preparing a packaged dough product, the method comprising
    providing a developed dough composition comprising
      from 0.2 to 1.5 parts by weight encapsulated basic leavening agent and,
      from 0.3 to 3.5 parts by weight glucono-delta-lactone acidic chemical leavening agent, and
      glucose oxidase enzyme,
    freezing the dough composition,
    placing the frozen dough composition into a low pressure package, reducing headspace of the package containing the frozen dough composition while the dough composition is frozen, and storing the packaged dough composition at refrigerated storage temperature for at least two weeks.

19. The method of claim 18 wherein the pH of the dough, after 2 weeks of refrigerated storage, is in the range from 5 to 6.5.

20. The method of claim 19 wherein after 6 weeks of refrigerated storage at 40 degrees Fahrenheit, the dough can be baked to a baked specific volume in the range from 3 to 4.5 cubic centimeters per gram.

* * * * *